US010432076B2

(12) United States Patent
Hyppias et al.

(10) Patent No.: US 10,432,076 B2
(45) Date of Patent: Oct. 1, 2019

(54) HYBRID ELECTRICAL MACHINE

(71) Applicant: MMT SA, Zug (CH)

(72) Inventors: Arnaud Hyppias, Fraisans (FR);
Hubert Poinceau, Biel/bienne (CH)

(73) Assignee: MMT SA, Zug (CH)

( * ) Notice: Subject to any disclaimer, the term of this patent is extended or adjusted under 35 U.S.C. 154(b) by 167 days.

(21) Appl. No.: 15/127,601

(22) PCT Filed: Mar. 19, 2015

(86) PCT No.: PCT/EP2015/055846
§ 371 (c)(1),
(2) Date: Sep. 20, 2016

(87) PCT Pub. No.: WO2015/140266
PCT Pub. Date: Sep. 24, 2015

(65) Prior Publication Data
US 2017/0141670 A1    May 18, 2017

(30) Foreign Application Priority Data

Mar. 21, 2014  (FR) .................................... 14 52382

(51) Int. Cl.
*H02K 41/02* (2006.01)
*H02K 41/03* (2006.01)
*H02K 21/12* (2006.01)
*H02K 37/18* (2006.01)
*H02K 1/14* (2006.01)
(Continued)

(52) U.S. Cl.
CPC ........... *H02K 41/031* (2013.01); *H02K 1/146* (2013.01); *H02K 1/24* (2013.01); *H02K 21/12* (2013.01); *H02K 21/125* (2013.01); *H02K 37/18* (2013.01); *H02K 37/04* (2013.01); *H02K 2201/12* (2013.01)

(58) Field of Classification Search
CPC ........ H02K 41/031; H02K 1/146; H02K 1/24; H02K 21/12; H02K 2201/12
USPC ....................................................... 310/12.25
See application file for complete search history.

(56) References Cited

U.S. PATENT DOCUMENTS

| 4,306,164 A | 12/1981 | Itoh et al. |
| 4,339,679 A | 7/1982 | Urschel |
| 7,028,545 B2 | 4/2006 | Gandel et al. |

(Continued)

FOREIGN PATENT DOCUMENTS

GB    2052175 A    1/1981

*Primary Examiner* — Jianchun Qin
(74) *Attorney, Agent, or Firm* — Harness, Dickey & Pierce, PLC

(57) ABSTRACT

A hybrid electric machine includes N phases (N≥1), each phase having first and second assemblies movable relative to one another and each having a set of teeth made up of a number of teeth that are equally distributed according to a plurality of periods, in which: a. the first assembly is made up of two magnetized parts, each including a magnet magnetically coupled with two toothed yokes, the magnet of one of the magnetized parts being polarized along the same axis but in the opposite direction to the polarization of the magnet of the second magnetized part; b. the second assembly including at least two toothed zones with pitches identical to the pitch of the toothed yokes; c. one of the assemblies has at least two sets of teeth in phase, and the other assembly has at least two sets of teeth which are out of phase by a half-period.

20 Claims, 6 Drawing Sheets

(51) Int. Cl.
  *H02K 1/24* (2006.01)
  *H02K 37/04* (2006.01)

(56) References Cited

U.S. PATENT DOCUMENTS

| | | |
|---|---|---|
| 7,034,425 B2 | 4/2006 | Detela |
| 8,860,282 B2 | 10/2014 | Gandel et al. |
| 8,890,514 B2 | 11/2014 | Masson et al. |
| 9,276,454 B2 | 3/2016 | Arlot et al. |
| 9,316,482 B2 | 4/2016 | Delbaere et al. |
| 9,887,608 B2 * | 2/2018 | Takemoto .............. H02K 1/145 |
| 2006/0123903 A1 | 6/2006 | Gandel et al. |
| 2006/0192453 A1 | 8/2006 | Gieras et al. |
| 2007/0267929 A1 * | 11/2007 | Pulnikov ................ H02K 1/145 |
| | | 310/156.02 |
| 2008/0211326 A1 | 9/2008 | Kang et al. |
| 2012/0104905 A1 | 5/2012 | Prudham et al. |
| 2012/0146627 A1 | 6/2012 | Masson et al. |
| 2013/0169270 A1 | 7/2013 | Delbaere et al. |
| 2014/0150265 A1 | 6/2014 | Arlot et al. |
| 2014/0283732 A1 | 9/2014 | Heinrich |
| 2015/0263572 A1 | 9/2015 | Hyppias et al. |

* cited by examiner

Figure 3
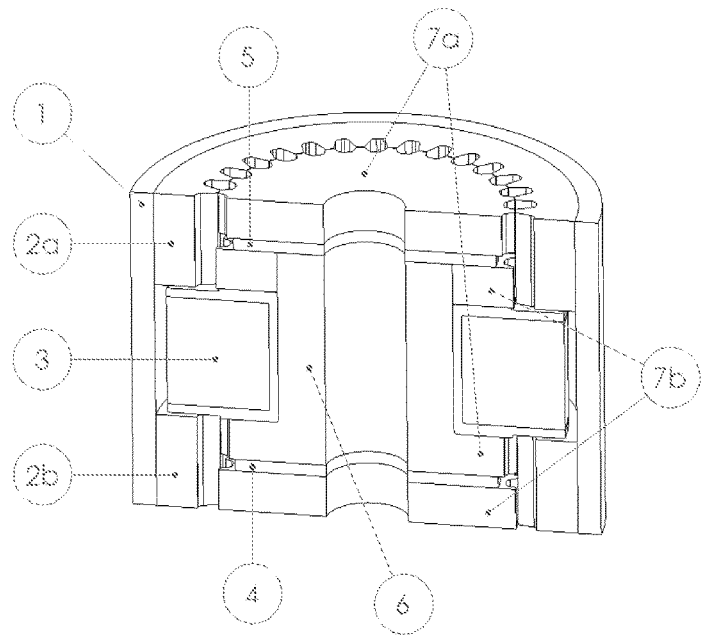
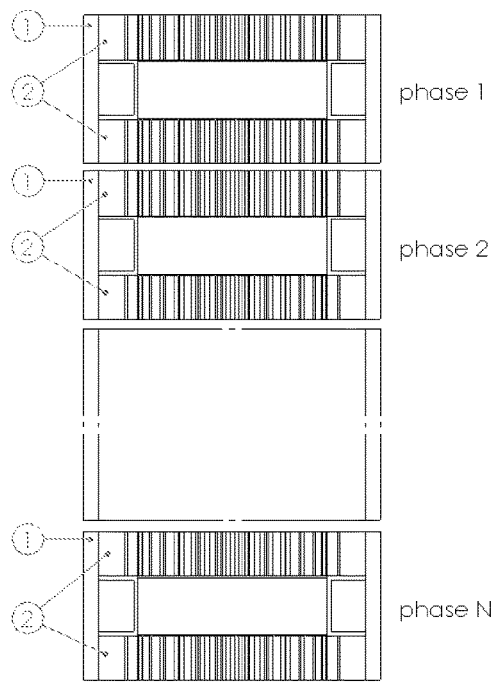
Figure 4a
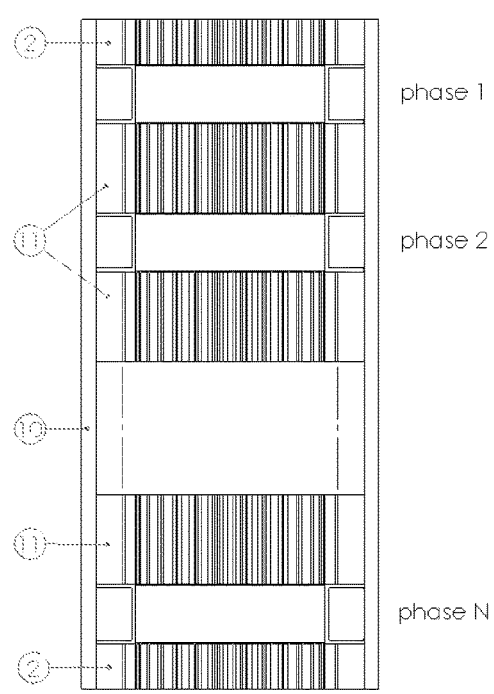
Figure 4b

HYBRID ELECTRICAL MACHINE

CROSS-REFERENCE TO RELATED APPLICATIONS

This application is a National Phase Entry of International Patent Application No. PCT/EP2015/055846, filed on Mar. 19, 2015, which claims priority to French Patent Application Serial No. 1452382, filed on Mar. 21, 2014, both of which are incorporated by reference herein.

TECHNICAL FIELD

The invention relates to the field of hybrid electrical machines, that is to say having the characteristics of a permanent-magnet machine and of a variable-reluctance machine. More particularly, the invention relates to a machine, driving or generating, the principle of which may be implemented for a rotary or linear movement. Typically, the rotor of a hybrid machine has a plurality of teeth as with a variable-reluctance motor, but each tooth is polarised as with a permanent-magnet motor.

BACKGROUND

Various machines of the hybrid type are already known in the prior art. For example, U.S. Pat. No. 4,306,164 presents a motor of the stepping homopolar type, that is to say having a unidirectional magnet flux in only one direction. In this diphase motor the polarisation magnet is placed at the centre of the structure, on the movable assembly or the fixed assembly. The two faces of the motor are implemented by two coils, the winding axis of which corresponds to the rotation axis (winding said to be "global") and each coil is extended, on either side, by toothed rings connected by a magnetic flux return. The phase difference between the teeth of the various phases at the stator and rotor allow viability of the diphase functioning. Through the fact that the magnet is situated at the centre of the structure, the two phases of the motor are completely dependent and cannot function without the presence of the other. In addition, the homopolar character of the motor (the magnetic field passing through the coils is always oriented in a single direction) has the consequence of limiting the torque that can be achieved since the magnetic flux generated by the magnet always circulates in the single direction around each coil so that the variation in flux as a function of the rotation is intrinsically limited. The circulation of the flux of this type of motor is transverse.

Moreover, hybrid machines are already known having two magnets with opposite polarities disposed at the rotor as for example in U.S. Pat. No. 4,339,679. This type of motor solves the previously mentioned problem by making it possible to reverse the magnetic flux generated by the magnets through each of the phases, intrinsically increasing the torque factor of the motor or generator. To do this, the motor comprises, at the rotor, two superimposed modules consisting of magnets extended on either side by toothed ferromagnetic rings, and has a stator having a plurality of toothed ferromagnetic poles around which coils are wound. The coils being installed on an axis transverse to the rotation axis, the magnetic flux circulates from pole to pole on a path that is no longer exclusively transverse. This topology has several drawbacks.

First of all, the winding of each pole (so-called "concentrated" winding) gives rise to an increased difficulty in implementation. Each coil must be installed around each pole. To benefit from all the action of the periphery of the motor there are therefore necessarily a plurality of coils belonging to each phase, increasing the number of manipulations. In addition, to keep an optimum space factor and shape factor (in order to reduce the intrinsic resistance of each coil), each pole must be formed, that is to say have a pole head, further complicating the implementation and thus promoting the magnetic saturation of the poles, which therefore prevents the motor from keeping advantageous characteristics at high currents.

This type of motor also has another significant drawback. This is because, even if this topology makes it possible to respond to the reversal of the direction of the magnetic field passing through each coil, having a plurality of phases distributed over the periphery of the motor necessarily means that each phase does not benefit from all the rotor teeth (half the rotor teeth are active for a given phase at a given position). Thus, to keep the benefits of the hybrid motor, these motors are therefore particularly advantageous when used with many relatively large teeth, around 50 teeth per toothed ring at the rotor typically. This high number of teeth, though it is advantageous for generating a more generous torque, is nevertheless to the detriment of tooth to tooth magnetic leakages, which are greater than in a machine such as U.S. Pat. No. 4,306,164. It should also be added that the coupling between the phases is not zero, giving rise to an unfavourable mutual inductance.

SUMMARY

The object of the invention is to propose a hybrid machine that is improved with respect to the prior art discussed. The solution proposed uses both a global winding independent of the pole pitch and a number of magnets independent of the number of pairs of poles. Compared with the structures of the transverse-flux machines already known, this novel topology has equivalent, or even superior, performances but with a great simplification of the design and a reduction in the magnet volume. The global winding and the global magnets make it possible to reduce the number of parts, to reduce the cost and to simplify the assembly process.

During the functioning of the machine, the coil creates a field with a direction determined by the direction of the current. The magnets distribute their flux through the coil via the teeth of two of the pole pieces of the rotor in phase angularly. The rotor is aligned with the stator in a stable position. A change in direction of the current enables the rotor to pass into a new stable position.

Particularly, the main object of the invention is to propose a hybrid machine making it possible to benefit from the advantages of a global-winding machine and those of a concentrated-winding machine. One of the objects of the invention is therefore to produce a machine keeping a high torque factor even with a limited number of teeth making it possible to reduce magnetic leakages and to keep a high torque factor even under a strong electric current injected into the coils. Another object of the invention is to produce a machine the electrical phases of which are independent of each other, by constituting independent modules for each phase. Another object of the invention is also to enable a design with external rotor or internal rotor without changing the various assemblies forming the machine, by firmly connecting the coil to the first assembly carrying the magnets or to the second assembly not carrying the magnets. Finally, one object of the invention is to allow linear or rotary implementation of a hybrid machine.

More particularly, the invention relates to a hybrid electrical machine with N phases (N greater than or equal to 1), each phase comprising first and second assemblies able to move with respect to each other, one of said assemblies being a magnetised assembly, one or other of said assemblies comprising at least one coil, each of said assemblies having sets of teeth consisting of a number of teeth also distributed at P periods, characterised in that a. the first assembly consists of two magnetised parts, each comprising a magnet coupled magnetically to two toothed yokes, the magnet of one of said magnetised parts being polarised on an identical axis and in the opposite direction to the polarisation of the magnet of the second magnetised part, one of the toothed yokes of one of said magnetised parts being coupled magnetically by a ferromagnetic piece to one of said toothed yokes of the other magnetised part, b. the second assembly comprises at least two toothed zones, with pitches identical to the pitches of said toothed yokes, said toothed zones being coupled magnetically by a ferromagnetic piece, c. one of the assemblies comprising said toothed zones and said toothed yokes has at least two sets of teeth in phase, and the other assembly has at least two sets of teeth out of phase by a half-period.

In a particular embodiment, the coil is fixed with respect to the first assembly and the movable part of the machine is formed by the second assembly. In another embodiment, the coil is fixed with respect to the second assembly and the movable part of the machine is formed by the first assembly. In order to produce a polyphase machine, in a particular embodiment, N is strictly greater than 1, the N coils of the machine are coaxial and the N phases are stacked in the axial direction. In this case, it is possible to produce the ferromagnetic piece connecting the various toothed zones by means of a single piece.

In a particular embodiment, the toothed yokes of the first assembly coupled to the same magnet have a phase difference of a half-period, and the two toothed zones of the second assembly have a number of teeth also distributed along the direction of movement and are in phase. In order to increase the compactness of the machine, in an alternative embodiment, the toothed zones or yokes of at least one of the two assemblies have local extensions reducing the distance between two toothed parts of the same assembly. In order to optimise the use of the physical properties of the materials, in a particular embodiment, the toothed zones or yokes of at least one of the two assemblies have a body and an end and the end is formed in a ferromagnetic material distinct from the material of the body.

BRIEF DESCRIPTION OF THE DRAWING

The invention will be understood better from a reading of the following description, referring to the accompanying drawings, where:

FIG. 3 shows a view in cross section and perspective of a phase of the electrical machine according to a third embodiment.

FIGS. 4a and 4b depict a view in cross section of the second assembly of an axial polyphase structure according to the invention.

DETAILED DESCRIPTION OF AN EMBODIMENT

Figure 1:
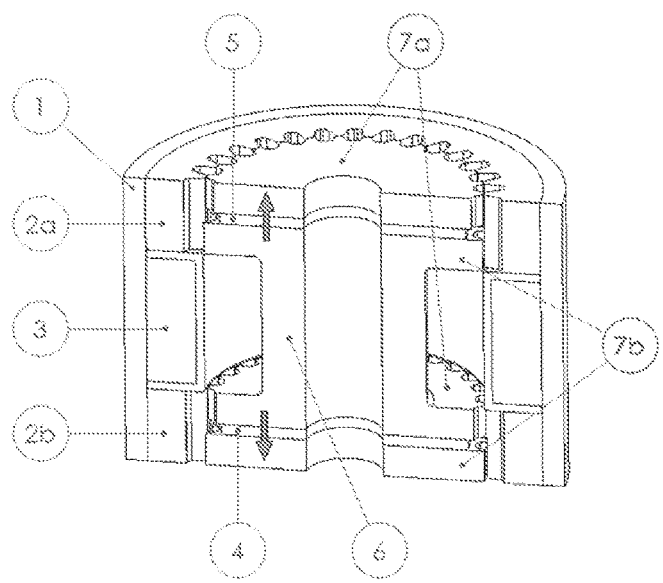
FIG. 1 shows a view in cross section and perspective of a phase of the electrical machine according to a first embodiment.

One of the solutions proposed for producing a phase of the electrical machine is shown in FIG. 1. Each phase comprises an electrical coil 3 and two ferromagnetic assemblies able to move with respect to each other.

The first assembly comprises two sets of pieces each composed of a magnet 4 and 5 and first 7a and second 7b toothed yokes. Each set is facing, radially, one of the toothed zones 2a, 2b of the second assembly. These two sets of pieces are magnetically coupled by a ferromagnetic piece 6. The magnets of each of these sets, magnetised axially, have opposite polarities, as illustrated by the arrows shown in FIG. 1. The toothed yokes 7a and 7b form pairs of poles once polarised by the magnet. The spacing of the uniformly distributed teeth defines the pole pitch. The number of pairs of poles is independent of the number of magnets, but dependent on the set of teeth and the pole pitch. In order to create the alternation of magnetic poles allowing rotation of the machine, the two toothed yokes 7a and 7b in the same set have an angular phase difference of a half-period. Thus the four toothed yokes 7 constituting the first assembly are in phase angularly in pairs, one in each set 7a, and offset by a half-period with respect to the other two 7b. The phase differences in FIG. 8a, which repeats this same configuration, can in particular be assessed.

The second assembly has third and fourth ferromagnetic parts in a form of two toothed zones 2a and 2b situated on either side of the coil 3 and connected by a ferromagnetic piece 1. The magnetic flux produced by the circular coil 3 therefore flows through the toothed zones 2a and 2b. These toothed zones 2a and 2b define, through the spacing of the uniformly distributed teeth, the pole pitch. In the configuration illustrated here, the teeth of these pole pieces are in phase angularly. As with the first assembly, the number of poles created depends on the set of teeth and the pole pitch, but is independent of the number of coils.

Figure 2A:
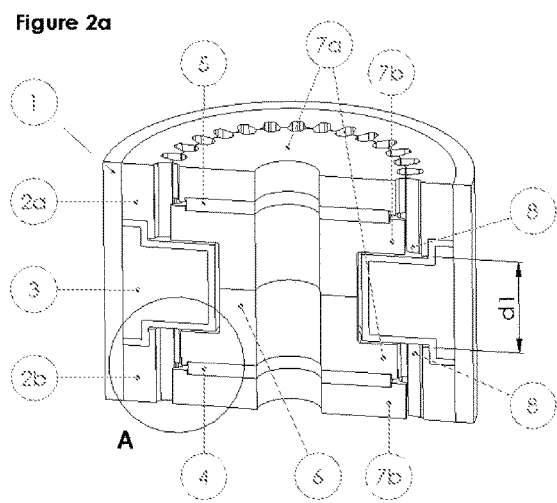
FIGS. 2a and 2b show a view in cross section and perspective of a phase of the electrical machine according to a second embodiment.
Figure 2B:
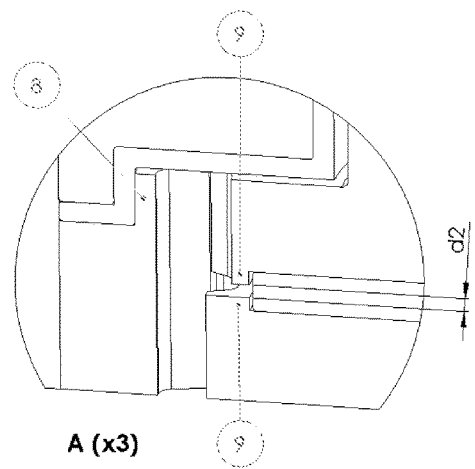

FIG. 2a shows the toothed zones of the second assembly 2 having local extensions, referred to as "pole heads" 8 reducing the distance d1 between the two toothed zones 2a, 2b. The yokes of the first assembly 7 also have pole heads 9 reducing the distance d2 between them, as can be seen in FIG. 2b showing a detail view of FIG. 2a. The coil 3 extends in the cavity of the first assembly so as to occupy the entire space available.

These FIG. 2 show that, in order to increase the torque and/or to reduce the overall size of the machine, the poles of the first assembly 9 and/or of the second assembly 8 may be locally extended, thus increasing the active length characterised by the height of the teeth. In addition, in order to increase the volume of copper, it is possible to extend the coil 3 inside the cavity formed at the ferromagnetic piece of the first assembly. In the configuration in FIGS. 2a and 2b, the mean radius of the air gap lies between the inside diameter and the outside diameter of the coil, demonstrating the great diametral compactness possible with this embodiment.

In FIG. 3, the coil 3 is secured to the first assembly. The rotor of the machine is formed by the second non-magnetised assembly. The coil 3 can easily be disposed on the assembly carrying the magnets. The structure thus formed has the same advantages as the one described previously. In the case of a machine with an external rotor, this configuration further simplifies the construction of the rotor, which consists merely of the toothed zones 2 connected by a ferromagnetic piece 1.

In FIG. 4a, the principle of implementation of a polyphase motor according to the invention can be seen, where each phase represents an independent module. The various modules are placed above one another. The second assembly of each phase consists of two toothed ferromagnetic zones 2 situated on either side of the coil 3 and connected by a ferromagnetic piece 1 particular to each phase. In FIG. 4b, the ferromagnetic piece of the end phases is put in common and constitutes a single piece 10. In the same way, the bottom toothed zone of a phase is put in common with the top toothed zone of the adjacent phase in order to form a single piece 11.

FIGS. 4a and 4b thus illustrate two different ways of constructing a polyphase axial structure. FIG. 4a shows completely independent phases that are juxtaposed with each other. FIG. 4b shows that some components can be put in common in order to reduce the number of pieces. The various ferromagnetic pieces may be assembled in a single piece 10. The adjacent toothed zones of two consecutive phases may be connected in order to form only a single piece 11.

Supplying a global winding with an alternating current creates a pulsating field rather than a rotating field since there is only one phase per module. A pulsating field may be broken down into two single-phase rotating fields of equal amplitudes but opposite rotation directions. The rotor is therefore free to catch the direct component or the inverse component of the field. To control this direction of rotation, a plurality of single-phase modules are associated, offset from each other in space, and the supply to which is offset in time, in order to eliminate one of the two components, and create a rotating field. This principle of stacking of modules of a transverse flux machine is extended to all polyphase motors, in particular diphase and triphase, for which respective phase differences of 90° and 120° electrical between modules (at the stator or rotor) and in the supply to the phases will be provided.

Figure 5:
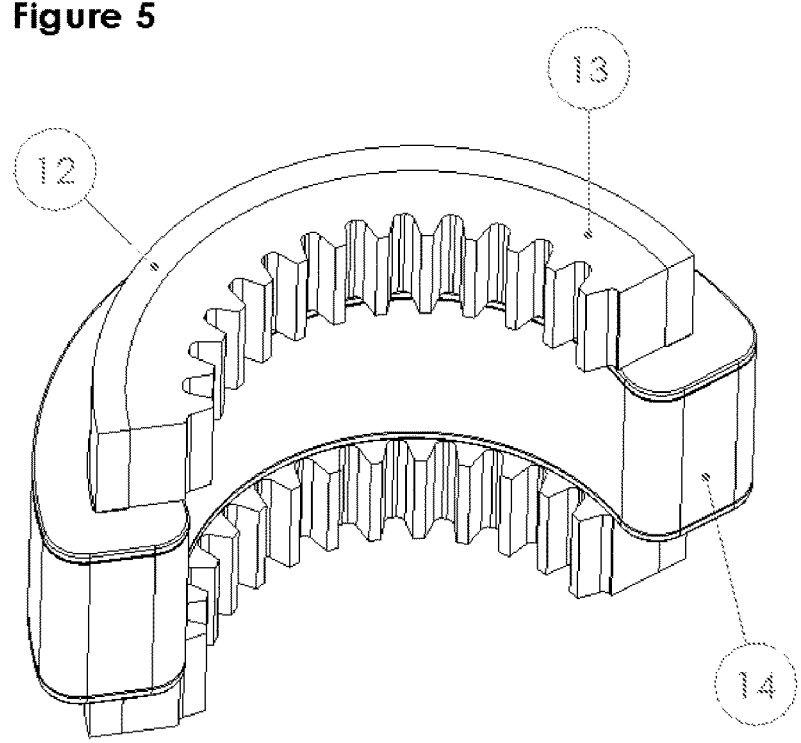
FIG. 5 shows a view in perspective of the second assembly of a phase of the electrical machine according to a fourth embodiment.

FIG. 5 shows the second assembly of the electrical machine according to the invention in a configuration dedicated to the construction of a radial polyphase structure. This second assembly has two toothed ferromagnetic zones 13 situated on either side of the coil 14 and connected by a ferromagnetic piece 12. The coil is then installed so as to grip said ferromagnetic piece.

Figure 6:
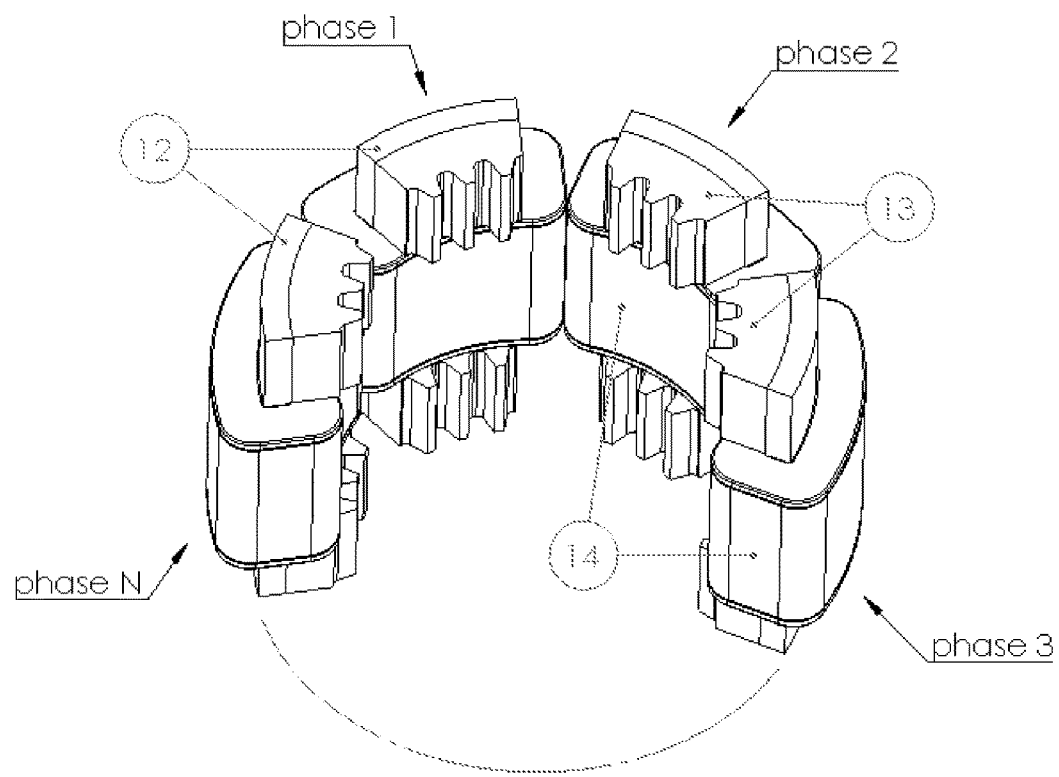
FIG. 6 shows a view in perspective of a polyphase structure repeating the embodiment in FIG. 5.

Although the invention is particularly advantageous and best exploited in the previously described embodiments, it is possible to vary the invention according to other topologies. FIG. 6 illustrates the construction of a radial polyphase structure using a plurality of modules of the type described in FIG. 5. The N phases are installed in the same plane and offset from each other in space. The radial configuration thus makes it possible to produce a configuration that is more compact in height to the detriment of performance compared with an axial configuration having a greater axial size.

Figure 7:
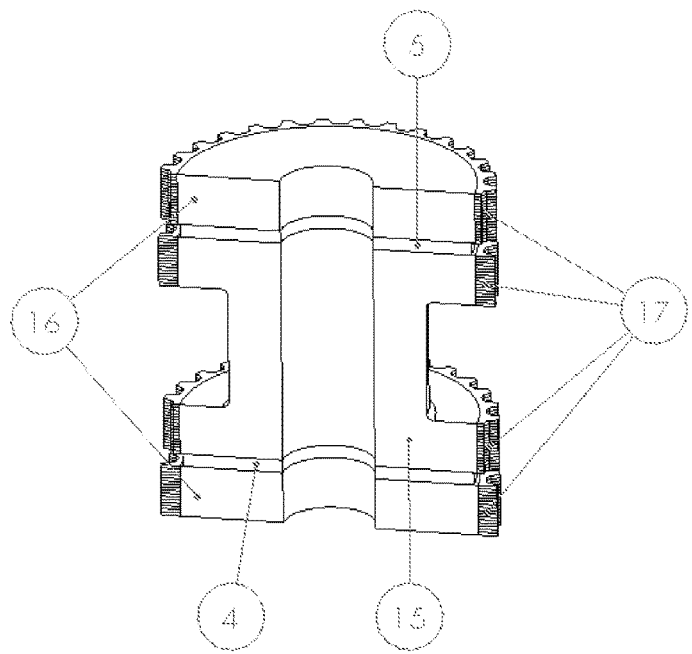
FIG. 7 shows a view in cross section and perspective of the second assembly of a phase of the electrical machine according to a fifth embodiment.

FIG. 7 shows one of the assemblies of the machine produced by means of two different ferromagnetic materials and arranged so as to take best advantage of the characteristics of each of them. The bodies 15 and 16 are produced from a first ferromagnetic material and the toothed ends 17 are produced from a second ferromagnetic material and installed around and secured to the bodies 15 and 16.

Thus, the body of this assembly can be produced by means of sintered powder 15 and 16 for the purpose of assisting the circulation of the 3D flux and minimising losses of iron. The toothed ends 17 for their part are produced by means of stacks of plates in order to increase the saturation field in the teeth. According to requirements, the magnetic materials used may be plates and packets of plates, cropped and pressed pieces, solid pieces or sintered pieces, as well as any combination of these elements.

Figure 8A:
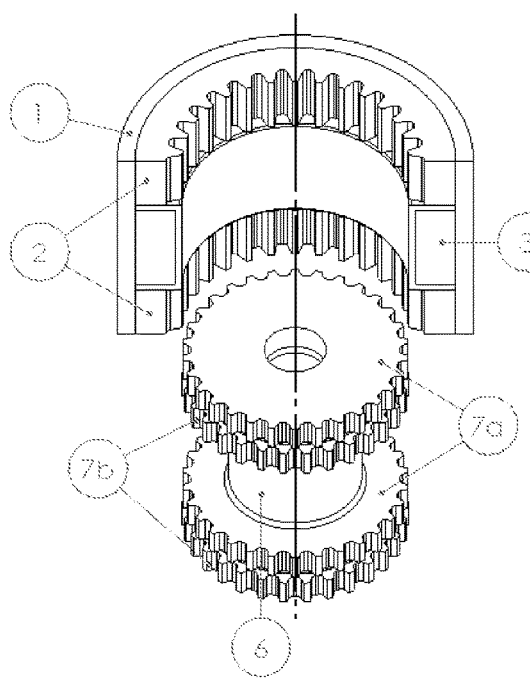
FIGS. 8a and 8b show a view in partial cross section and perspective of a phase.
Figure 8B:
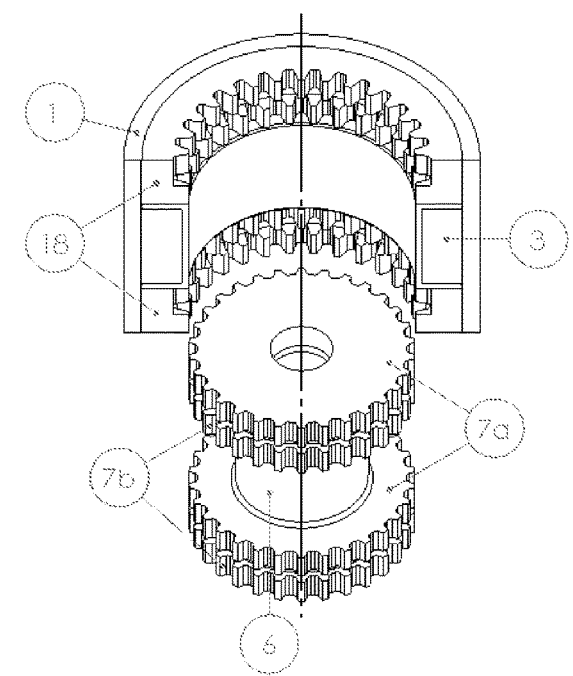

FIGS. 8 illustrate the different angular positionings that the yokes and toothed zones can adopt. Concerning FIG. 8a, the two yokes 7a and 7b in each set of toothed yokes in the first assembly have an angular offset of a half-period, the two toothed zones of the second assembly 2 are in phase angularly. Concerning FIG. 8b, the two yokes 7a and 7b in each set of toothed yokes in the first assembly are in phase angularly, each toothed zone of the second assembly 18 is subdivided into two parts, each facing a toothed yoke 7 of the first assembly, which have an angular offset of a half-period between them.

As explained previously, the structure described here requires the creation of an alternation of poles enabling the machine to rotate. For this purpose, the toothed pieces of one of the assemblies must be in phase angularly in pairs and offset by a half period with respect to the other two. The toothed pieces of the other assembly are in phase angularly. According to requirements, the offsetting may be done either at the pieces of the first assembly 7, FIG. 8a, or at the pieces of the second assembly 18, FIG. 8b.

Figure 9:
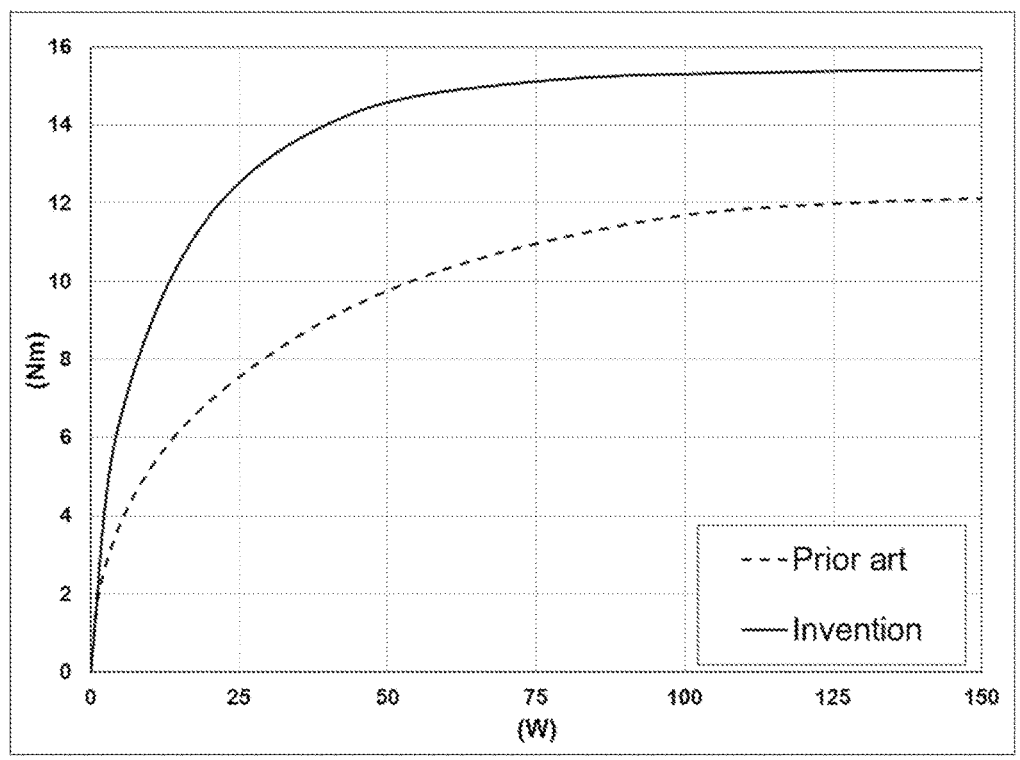
FIG. 9 is a graph showing the change in the torque as a function of the power of a hybrid machine of the prior art and of a machine according to the invention of identical size.

FIG. 9 illustrates the torque (expressed in newton meters Nm) as a function of the power (expressed in watts W) of a machine as described here in comparison with a machine of the prior art. The machine of the prior art is a diphase hybrid motor with an internal rotor with a diameter of 80 mm and the useful length of which is 110 mm. This motor comprises 8 concentrated windings and has 50 pairs of poles.

The machine according to the invention with an internal rotor also comprises two phases and has the same overall size. These two phases are associated as described in FIG. 4a.

The stator is produced as illustrated in FIG. 2. The ferromagnetic piece 1 is produced by means of sintered powder. The toothed zones 2 are produced by means of stacks of plates. They have pole heads 8 increasing their active length. Thus the so-called active height represents approximately 60% of the total height of the phase in question.

The rotor is produced as illustrated in FIG. 7. The central part 15 and 16 is produced by means of a sintered powder. The toothed yokes 17 for their part are produced by means of stacks of plates. The motor thus formed has 30 pairs of poles. The angular width of the teeth represents approximately 27% of the pole pitch.

The graph in FIG. 9 shows that, with regard to the static torque, the structure according to the invention offers performances superior to the machine of the prior art for equal size. The motor constant, the image of the slope at the origin of the curves, is multiplied by 4. The maximum torque for its part increases by approximately 22%.

Figure 10:
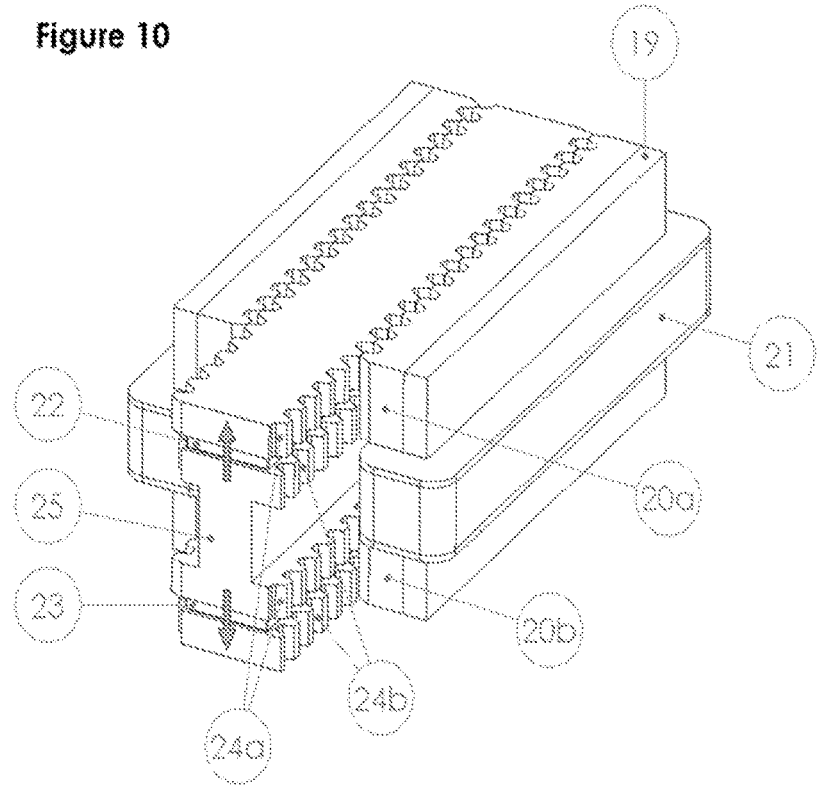
FIG. 10 shows a perspective view of the electrical machine according to a sixth embodiment.

In FIG. 10, the principle of production of a diphase linear motor according to the invention can be seen. This configuration is directly derived from the rotary structure. The second assembly comprises two phases placed on either side of the movable part. Each phase consists of two toothed ferromagnetic zones 20a and 20b situated on either side of the coil 21 and connected by a ferromagnetic piece 19, the coil is installed so as to grip said ferromagnetic piece.

The first assembly comprises two parts each composed of a magnet 22 and 23 and two toothed ferromagnetic yokes 24a and 24b. These parts, connected by a ferromagnetic piece 25, are facing the toothed zones of the second assembly 20. The magnets of each of these assemblies are of opposite polarities, as illustrated by the arrows appearing in FIG. 10.

In this example of diphase construction, the phase difference of 90° electrical between phases is provided by the offset of the sets of teeth carried by the first assembly. With respect to the phase that they face, the sets of teeth of the two toothed yokes 24a and 24b of the same assembly have an angular phase difference of a half-period, the sets of teeth of the four yokes 24 are in phase angularly in pairs, one in each assembly 24a, and offset by a half-period with respect to the other two 24b.

Figure 11:
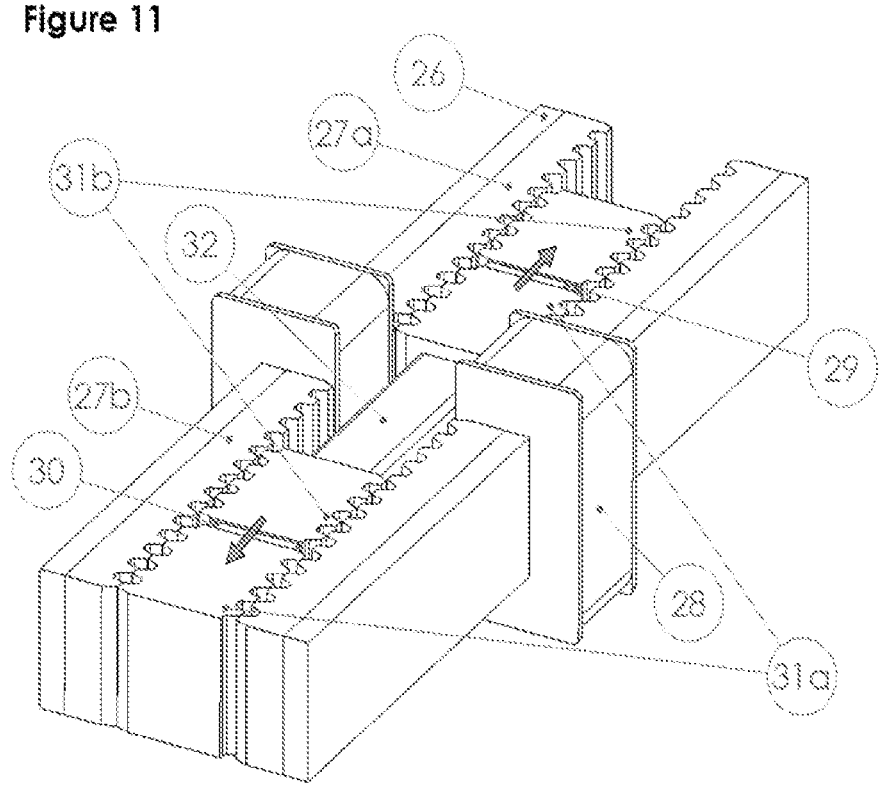
FIG. 11 shows a perspective view of the electrical machine according to a seventh embodiment.

FIG. 11 illustrates another embodiment of a diphase linear motor, extrapolated from the structure presented in FIG. 10. A particular advantage of this configuration is that it makes it possible to produce ferromagnetic pieces by means of stacks of plates, the orientation of the flux path being compatible with this embodiment. The manufacture of such a structure is greatly simplified thereby.

As with the structure in FIG. 10, the second assembly comprises two phases placed on either side of the movable part. Each phase consists of two toothed zones 27a and 27b situated on either side of the coil 28 and connected by a ferromagnetic piece 26. The electrical phase difference between phases is provided by the offset of the teeth carried by the first assembly. The first assembly, for its part, comprises two magnets 29 and 30 of opposite polarities, as illustrated in FIG. 11, four toothed ferromagnetic yokes 31a and 31b and one ferromagnetic piece 32. These pieces are arranged in two assemblies each composed of a magnet 29 and 30 and two toothed yokes 31a and 31b connected by the ferromagnetic piece 32. These assemblies are facing the toothed zones 27a and 27b of the second assembly. With respect to the phase in question, the teeth on the two toothed yokes 31a and 31b of the same assembly have an angular phase difference of a half-period, the teeth of the four yokes 31 are in phase angularly in pairs, one in each assembly 31a, and offset by a half-period with respect to the other two 31b.

The present invention is not limited to the few examples described above and can be envisaged in other variants without departing from the subject matter of the invention. The applications to which the invention particularly relates are, non-limitatively:

the motorisation of shutters or blinds where it can be envisaged making the second movable external assembly connected or attached to the shutter or blind;

in the same configuration: conveying, or drive rollers;

the driving of the wheels of vehicles (for example bicycles) in direct engagement or by contact of the roller type.

The invention claimed is:

1. A hybrid electrical machine comprising:
   N phases, N being greater than or equal to 1, each phase comprising first and second assemblies adapted to move with respect to each other, one of said assemblies being a magnetised assembly, one or other of said assemblies comprising at least one coil, each of said assemblies having a set of teeth including a number of teeth also distributed in a plurality of periods;
   a. said first assembly including a first magnetized part and a second magnetised part, said first magnetized part comprising a first magnet coupled magnetically to a first pair of toothed yokes, said second magnetized part comprising a second magnet coupled magnetically to a second pair of toothed yokes, said first and second magnets are different and separated, said first magnet being polarised on an identical axis and in an opposite direction to polarisation of said second magnet, one of said first pair of toothed yokes being coupled magnetically by a ferromagnetic piece to one of said second pair of toothed yokes;
   b. said second assembly comprises at least two toothed zones, with pitches identical to pitches of said pairs of toothed yokes, said toothed zones being coupled magnetically by a ferromagnetic piece; and
   c. one of said assemblies comprising said toothed zones and said pairs of toothed yokes having at least two sets of teeth in phase, and said other assembly having at least two sets of teeth out of phase by a half-period.

2. A hybrid electrical machine according to claim 1, wherein said coil is fixed with respect to said first assembly and said movable part of said machine is formed by said second assembly.

3. A hybrid electrical machine according to claim 1, wherein said coil is fixed with respect to said second assembly and said movable part of said machine is formed by said first assembly.

4. A hybrid electrical machine according to claim 1, wherein N is strictly greater than 1, said coils of said machine are coaxial and said N phases are stacked in an axial direction.

5. A hybrid electrical machine according to claim 4, wherein said ferromagnetic piece connecting the various of said toothed zones is produced by a single piece.

6. A hybrid electrical machine according to claim 4, wherein a bottom of said toothed zones of a phase is put in common with a top of said toothed zones of the adjacent phase in order to form a single piece.

7. A hybrid electrical machine according to claim 1, wherein said pair of toothed yokes of said first assembly coupled to said same magnet have a phase difference of a half-period, said two toothed zones of said second assembly have a number of said teeth equally distributed along a linear or curvilinear direction of movement, and they are in phase.

8. A hybrid electrical machine according to claim 1, wherein said toothed zones or yokes of at least one of said two assemblies have local extensions reducing a distance between two toothed parts of the same assembly.

9. A hybrid electrical machine according to claim 1, wherein said toothed zones or yokes of at least one of said two assemblies have a body and an end, and an end is formed from a ferromagnetic material distinct from a material of said body.

10. A hybrid electrical machine comprising:
- a first assembly comprising teeth distributed in a plurality of periods, said first assembly further comprising multiple magnet and yoke sections, said magnet of one of said sections being polarised on an identical axis and in an opposite direction to polarisation of said magnet of another of said sections;
- a second assembly comprising an electrically conductive coil and teeth distributed in a plurality of periods, one of said assemblies being moveable relative to the other of said assemblies;
- a first ferromagnetic connector connecting together said sections of said first assembly;
- said second assembly comprises at least two toothed zones, with pitches identical to pitches of said sections;
- a second ferromagnetic connector connecting together said toothed zones of said second assembly;
- distal ends of said teeth of said first assembly pointing outwardly away from a centerline of said first assembly, and said teeth of both sections uniformly alternating between spaced apart peaks and valleys; and
- at least two sets of said moving and stator teeth being in phase, and at least two sets of said moving and stator teeth being out of phase by a half-period.

11. A hybrid electrical machine according to claim 10, wherein said coil is globally wound coaxial with a rotational centerline of said magnets which are global magnets.

12. A hybrid electrical machine according to claim 10, wherein:
- said coil is fixed with respect to said second assembly and said first assembly is movable when the coil is energized with alternating current; and
- said multiple magnet and yoke sections of said first assembly include multiple spaced apart magnets.

13. A hybrid electrical machine according to claim 10, wherein said coil is in contact with said second ferromagnetic connector between said toothed zones.

14. A hybrid electrical machine according to claim 10, wherein said first and second assemblies are part of a radial polyphase alternating current motor, and said second connector is cylindrical and externally surrounds said teeth and said coil of said second assembly.

15. A hybrid electrical machine according to claim 10, further comprising an overhanging pole head projecting from at least one of said teeth in said toothed zones, and one of said magnets being located behind said pole head and internally extending therefrom toward a central bore.

16. A hybrid electrical machine according to claim 10, wherein said first and second assemblies are part of a linear alternating current motor.

17. A hybrid electrical machine according to claim 10, wherein said yokes are a first metallic material and said teeth of said first assembly are a second metallic material different than said first material.

18. A hybrid electrical machine comprising:
- a rotor comprising externally projecting teeth, multiple magnets and a ferromagnetic connector centrally connecting together and spacing apart said magnets, one of said magnets being polarised in an opposite direction to polarisation of an opposite of said magnets;
- a stator comprising internally projecting teeth, an electrically conductive coil located between a pair of said teeth, and a cylindrical ferromagnetic connector connecting together said teeth of said stator;
- said coil being globally wound coaxial with a rotational centerline of said magnets;
- a profile of each of said teeth of said rotor and said stator including tapered side walls between a narrow peak and a wide base adjacent valleys, said teeth of said rotor being entirely located between a first plane at one of said magnets adjacent to said rotor teeth and a second parallel plane along an opposite surface of said connector from which said rotor teeth extend; and
- at least two sets of said rotor and stator teeth being in phase, and at least two rotor and stator sets of said teeth being out of phase by a half-period.

19. A hybrid electrical machine according to claim 18, wherein said first and second assemblies are part of a radial polyphase alternating current motor which is configured to move one of: a shutter, a blind, a roller, a conveyor, or a cycle.

20. A hybrid electrical machine according to claim 18, wherein said connector of said rotor is a yoke made of a first metallic material and said teeth of said rotor are made of a second metallic material different than said first material.

* * * * *